US008779373B2

(12) United States Patent
Takeda et al.

(10) Patent No.: US 8,779,373 B2
(45) Date of Patent: Jul. 15, 2014

(54) RADIATION DETECTION APPARATUS, RADIATION DETECTION SYSTEM AND METHOD OF MANUFACTURING RADIATION DETECTION APPARATUS

(75) Inventors: Shinichi Takeda, Honjo (JP); Masato Inoue, Kumagaya (JP); Masayoshi Akiyama, Yokohama (JP); Takamasa Ishii, Honjo (JP); Satoru Sawada, Kodama-gun (JP); Taiki Takei, Okegawa-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 13/403,248

(22) Filed: Feb. 23, 2012

(65) Prior Publication Data

US 2012/0223237 A1    Sep. 6, 2012

(30) Foreign Application Priority Data

Mar. 2, 2011    (JP) ................................. 2011-045706

(51) Int. Cl.
*G01T 1/20*          (2006.01)
(52) U.S. Cl.
USPC .................................................. 250/370.11
(58) Field of Classification Search
USPC .................................................. 250/370.11
See application file for complete search history.

(56) References Cited

U.S. PATENT DOCUMENTS

| 6,847,041 | B2 | 1/2005 | Okada et al. |
| 7,244,945 | B2 | 7/2007 | Okada et al. |
| 2007/0257198 | A1* | 11/2007 | Ogawa et al. ............ 250/370.11 |
| 2010/0132785 | A1* | 6/2010 | Morooka et al. .............. 136/256 |
| 2010/0291726 | A1* | 11/2010 | Vieux et al. ..................... 438/59 |

FOREIGN PATENT DOCUMENTS

| CN | 101002110 A | 7/2007 |
| CN | 101606275 A | 12/2009 |
| CN | 101689556 A | 3/2010 |
| JP | 2003-066196 A | 3/2003 |

OTHER PUBLICATIONS

Thomas P. Flanagan, "Re-evaluating Hot Melt Adhesives," Adhesives Age, 9, No. 3, 28-31 (Mar. 1966).
Office Action in Chinese Application No. 201210052458.2 (dated Jan. 28, 2014).

* cited by examiner

*Primary Examiner* — Constantine Hannaher
(74) *Attorney, Agent, or Firm* — Fitzpatrick, Cella, Harper & Scinto

(57) ABSTRACT

A radiation detection apparatus includes a scintillator panel having a scintillator layer which converts radiation into light and a scintillator protective layer which protects the scintillator layer, and a sensor panel having a sensor array in which a plurality of photoelectric converters which detect light from the scintillator layer are arranged and a sensor protective layer which protects the sensor array. The scintillator panel is bonded to the sensor panel by making the scintillator layer adhere to the sensor protective layer by using the scintillator protective layer as an adhesive material. A principal component of the scintillator protective layer is the same as a principal component of the sensor protective layer.

7 Claims, 3 Drawing Sheets

RADIATION DETECTION APPARATUS, RADIATION DETECTION SYSTEM AND METHOD OF MANUFACTURING RADIATION DETECTION APPARATUS

BACKGROUND OF THE INVENTION

1. Field of the Invention

The present invention relates to a radiation detection apparatus, a radiation detection system including it, and a method of manufacturing a radiation detection apparatus.

2. Description of the Related Art

A radiation detection apparatus is known that converts radiation into light using a scintillator, and detects an image, formed by the light, using a sensor array in which a plurality of photoelectric converters are arranged. As a method of manufacturing such a radiation detection apparatus, Japanese Patent Laid-Open No. 2003-066196 discloses a method of bonding a fluorescent plate (scintillator) to an optical sensor (sensor array) with an adhesive material.

According to the method disclosed in Japanese Patent Laid-Open No. 2003-066196, after a scintillator and an optical sensor are manufactured, the scintillator and the optical sensor are bonded to each other by using an adhesive material prepared independently of them. This method therefore indispensably requires a step for applying an adhesive material, resulting in a complex manufacturing process. When using an adhesive material, the interface between the adhesive material and a member in contact with it causes reflection unless the refractive index difference between the adhesive material and the member in contact with it is small. This may lead to deterioration in sensitivity and resolution.

SUMMARY OF THE INVENTION

The present invention provides a technique advantageous in simplifying a manufacturing process and/or improving sensitivity and resolution.

The first aspect of the present invention provides a radiation detection apparatus comprising: a scintillator panel including a scintillator layer which converts radiation into light and a scintillator protective layer which protects the scintillator layer; and a sensor panel including a sensor array in which a plurality of photoelectric converters which detect light from the scintillator layer are arranged and a sensor protective layer which protects the sensor array, wherein the scintillator panel is bonded to the sensor panel by making the scintillator layer adhere to the sensor protective layer by using the scintillator protective layer as an adhesive material, and a principal component of the scintillator protective layer is the same as a principal component of the sensor protective layer.

The second aspect of the present invention provides a method of manufacturing a radiation detection apparatus, the method comprising: a first step of manufacturing a scintillator panel by bonding a scintillator protective layer to a scintillator layer, which converts radiation into light, so as to protect the scintillator layer; and a second step of bonding the scintillator panel to a sensor panel including a sensor array in which a plurality of photoelectric converters which detect light from the scintillator layer are arranged and a sensor protective layer which protects the sensor array, wherein in the first step, the scintillator protective layer is bonded to the scintillator layer by decreasing viscosity of the scintillator protective layer by heating the scintillator protective layer, and then increasing the viscosity by cooling the scintillator protective layer, and in the second step, the scintillator panel is bonded to the sensor panel by decreasing the viscosity of the scintillator protective layer by heating the scintillator protective layer, and then increasing the viscosity by further heating the scintillator protective layer.

The third aspect of the present invention provides a radiation detection system comprising: a radiation source; and a radiation detection apparatus defined in the first aspect, which is configured to detect radiation emitted from the radiation source and transmitted through a subject.

Further features of the present invention will become apparent from the following description of exemplary embodiments with reference to the attached drawings.

DESCRIPTION OF THE EMBODIMENTS

The embodiments of the present invention will be described below with reference to the accompanying drawings.

Figure 1:
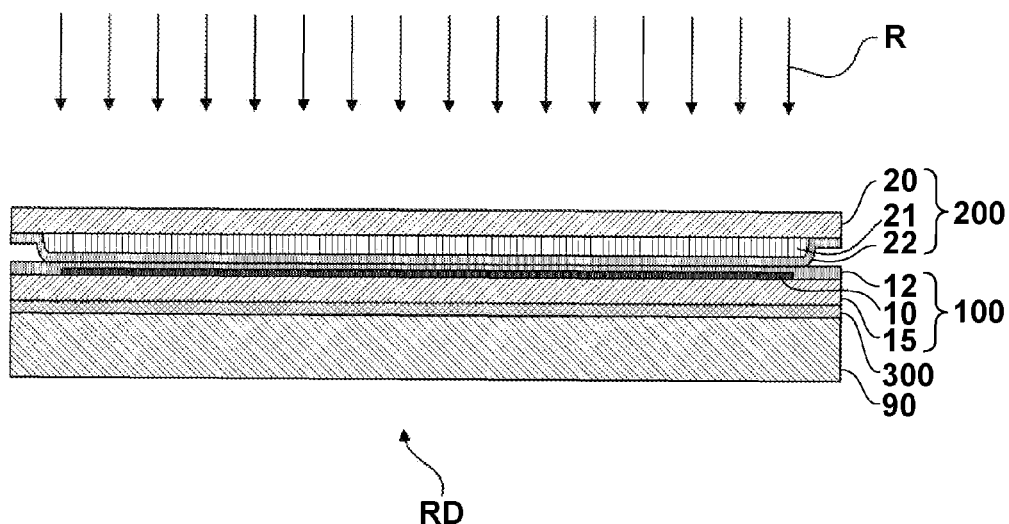
FIG. 1 is a sectional view schematically showing the arrangement of a radiation detection apparatus according to the first embodiment of the present invention.

A radiation detection apparatus RD according to the first embodiment of the present invention will be described with reference to FIG. 1. The operation of the radiation detection apparatus RD will be described first. Radiation (for example, X-rays) R emitted from a radiation source (not shown) to a subject is transmitted through the subject while being attenuated, and strikes a scintillator layer 21 of a scintillator panel 200. The scintillator layer 21 converts incident radiation into light (for example, visible light). The light converted by the scintillator layer 21 strikes a sensor array 10 of a sensor panel 100. The photoelectric converters of the sensor array 10 then convert the light into charge, which is read as an electrical signal to the outside by a peripheral circuit unit (not shown).

The arrangement of the radiation detection apparatus RD will be described next. The radiation detection apparatus RD includes the scintillator panel 200 and the sensor panel 100. The scintillator panel 200 includes the scintillator layer 21 that converts radiation into light and a scintillator protective layer 22 which protects the scintillator layer 21. The scintillator layer 21 can be formed from, for example, an aggregate of columnar crystals of CsI:Tl. The scintillator panel 200 can further include a support substrate 20 which supports the scintillator layer 21. The sensor panel 100 includes the sensor array 10 in which a plurality of photoelectric converters which detect light from the scintillator layer 21 are narranged, and a sensor protective layer 12 which protects the sensor array 10. The sensor panel 100 can further include the support substrate 15 which supports the sensor array 10. A base 90 can support a bonded member of the scintillator panel 200 and the sensor panel 100. An adhesive material 300 can bond the bonded member to the base 90.

The scintillator panel 200 is bonded to the sensor panel 100 by making the scintillator layer 21 adhere to the sensor protective layer 12 using the scintillator protective layer 22 as an adhesive material. Using the scintillator protective layer 22 as an adhesive material obviates the necessity to apply an adhesive material to the scintillator panel 200 or the sensor panel 100 when bonding the scintillator panel 200 to the sensor panel 100. This therefore simplifies the manufacturing process.

The principal component of the scintillator protective layer 22 is the same as that of the sensor protective layer 12. This can make the scintillator protective layer 22 and the sensor protective layer 12 have similar refractive indices, and hence can reduce the reflection of light at the interface between the scintillator protective layer 22 and the sensor protective layer 12 and improve the sensitivity and resolution. In this case, a principal component means a component, of a plurality of components constituting a member, which occupies the largest part of the total weight of the member.

The materials for the scintillator protective layer 22 and the sensor protective layer 12 can be hot-melt resins as thermoplastic organic materials. A hot-melt resin can be used after being molded into a sheet. A sheet-like hot-melt resin can be manufactured by injecting a molten hot-melt resin onto a film sheet such as PET using an extrusion coating method. The scintillator panel 200 can be manufactured by placing a sheet-like hot-melt resin on the support substrate 20 so as to cover the scintillator layer 21 and performing heat lamination or vacuum heat lamination on the scintillator layer 21. Likewise, the sensor panel 100 can be manufactured by placing a sheet-like hot-melt resin on a support substrate 15 so as to cover the sensor array 10 and performing heat lamination or vacuum heat lamination on the sensor array 10.

A hot-melt resin is a solid at room temperature, which includes neither water nor solvent, and is defined as an adhesive resin formed from a 100% nonvolatile thermoplastic material (Thomas. P. Flanagan, Adhesive Age, 9, No. 3, 28 (1966)). A hot-melt resin melts with a rise in temperature and solidifies in a drop in temperature. A hot-melt resin in a heated/molten state exhibits adhesiveness to other organic materials and inorganic materials. At normal temperature, this resin solidifies and exhibits no adhesiveness. A hot-melt resin contains no polar solvent, solvent, or water, and hence is suitable as a material for the scintillator protective layer 22 because it does not dissolve the scintillator layer (for example, a columnar crystal structure made of an alkali halide) 21 even with contact with the scintillator layer 21. A hot-melt resin differs from a solvent-evaporation-setting type adhesive resin formed by dissolving a thermoplastic resin in a solvent and using a solvent coating method. A hot-melt resin also differs from a chemical reaction type adhesive resin typified by epoxy formed by chemical reaction. Hot-melt resin materials are classified according to the types of base polymers (base materials) as principal components. It is possible to use polyolefin-based resins, polyester-based resins, polyamide-based resins, and the like.

Figure 2:
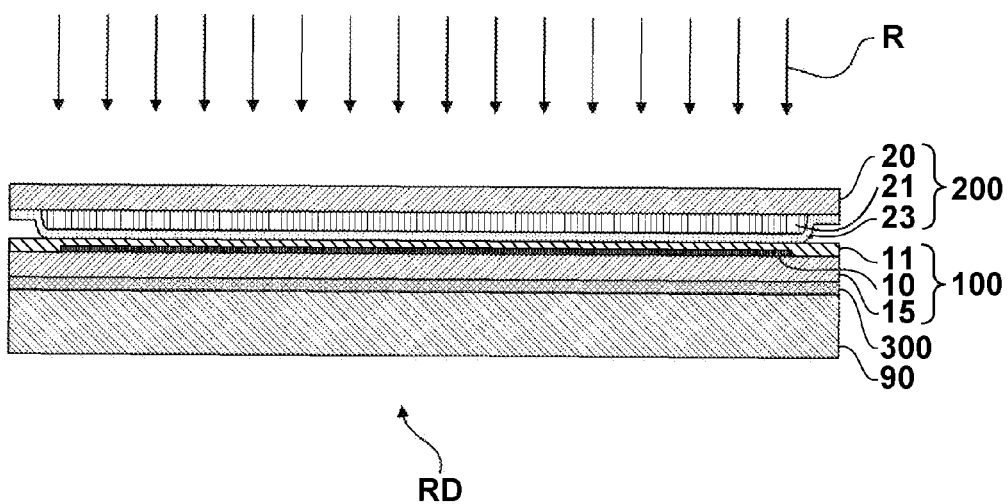
FIG. 2 is a sectional view schematically showing the arrangement of a radiation detection apparatus according to the second embodiment of the present invention.

A radiation detection apparatus RD according to the second embodiment of the present invention will be described with reference to FIG. 2. Particulars that are not mentioned in the second embodiment can comply with the first embodiment. In the second embodiment, a material for a scintillator protective layer 23 which protects a scintillator layer 21 is a thermoplastic and thermosetting polyimide resin. A material for a sensor protective layer 11 which protects a sensor array 10 is a thermosetting polyimide resin. That is, in the second embodiment as well, the principal component of the scintillator protective layer 23 is the same as that of the sensor protective layer 11. This can make the scintillator protective layer 23 and the sensor protective layer 11 have similar refractive indices. This makes it possible to reduce the reflection of light at the interface between the scintillator protective layer 23 and the sensor protective layer 11 and improve the sensitivity and resolution. The thermoplastic and thermosetting polyimide region forming the scintillator protective layer 23 has a refractive index of 1.6 to 1.7. The thermosetting polyimide resin forming the sensor protective layer 11 has a refractive index of 1.7.

A thermoplastic and thermosetting polyimide resin is a resin which contains an organic solvent soluble polyimide, epoxy compound, and latent hardener. The epoxy compound contains a solid epoxy compound and a liquid epoxy compound. The organic solvent soluble polyimide is a principal component. The thermoplastic and thermosetting polyimide resin starts to decrease in viscosity when its temperature rises and exceeds the first temperature (for example, 30° C.), and develops adhesiveness when the temperature exceeds the second temperature (for example, 40° C.) higher than the first temperature. The thermoplastic and thermosetting polyimide resin further starts to increase in viscosity (harden) when the temperature exceeds the third temperature (for example, 110° C.) higher than the second temperature, and loses adhesiveness when the temperature exceeds the fourth temperature (160° C.) higher than the third temperature. In this case, for example, the thermoplastic and thermosetting polyimide resin can maintain adhesiveness for five min or more at a temperature equal to or more than the second temperature and less than the third temperature, even if it is left standing in a constant temperature state, but loses adhesiveness in less than five min at the third temperature or more.

A method of manufacturing the radiation detection apparatus RD according to the second embodiment will be described below. This manufacturing method includes the first and second steps. In the first step, a scintillator panel 200 is manufactured by bonding a scintillator protective layer 23 to a scintillator layer 21 so as to protect the scintillator layer 21. More specifically, in the first step, the scintillator protective layer 23 is bonded to the scintillator layer 21 by decreasing the viscosity of the scintillator protective layer 23 by heating it and then increasing the viscosity by cooling the scintillator protective layer 23. In the second step, a sensor panel 100 including the sensor array 10 and a sensor protective layer 11 is bonded to the scintillator panel 200. More specifically, in the second step, the scintillator panel 200 is bonded to the sensor panel 100 by decreasing the viscosity of the scintillator protective layer 23 by heating it and then increasing the viscosity by further heating the scintillator protective layer 23.

The thermoplastic and thermosetting polyimide resin can be used after being molded into a sheet. It is possible to mold a thermoplastic and thermosetting polyimide resin into a sheet by uniformly mixing components constituting a polyimide resin and then performing rolling (for example, roll rolling) of the polyimide resin while clamping it with plastic members or the like. It is also possible to coat a plastic film with a varnish-like mixture of thermoplastic polyimide and a solvent and process the resultant structure into a sheet upon desolventization.

In the first step, the sheet-like thermoplastic and thermosetting polyimide resin is placed on the support substrate 20 so as to cover the scintillator layer 21 formed on it, and the polyimide resin is heat-pressed on the scintillator layer 21. This bonds the scintillator layer 21 to the scintillator protective layer 23.

A thermoplastic and thermosetting polyimide resin as the scintillator protective layer 23 is bonded to the scintillator layer 21 by heat lamination or vacuum heat lamination at a temperature in the range of 40° C. to 150° C. in which the viscosity of the polyimide resin decreases. In this state, the thermoplastic and thermosetting polyimide resin as the scintillator protective layer 23 has the function of a thermoplastic material. Cooling (forced cooling or natural cooling) the thermoplastic and thermosetting polyimide resin as the scintillator protective layer 23 will increase the viscosity and bond the polyimide resin to the scintillator layer 21.

In the second step, the sensor panel 100 is bonded to the scintillator panel 200 by heat-pressing the scintillator panel 200 to a sensor array 10 mounted on a base 90. It is possible to perform this heat-pressing at a temperature of 100° C. or more and a pressure of 0.1 MPa or more. The second step can be done by heat lamination or vacuum heat lamination at a temperature in the temperature range of 120° C. or more to 300° C. or less. This makes the scintillator protective layer 23 thermally set in tight contact with a sensor protective layer 13 of the sensor panel 100, thereby bonding the scintillator panel 200 to the sensor panel 100.

Figure 3:
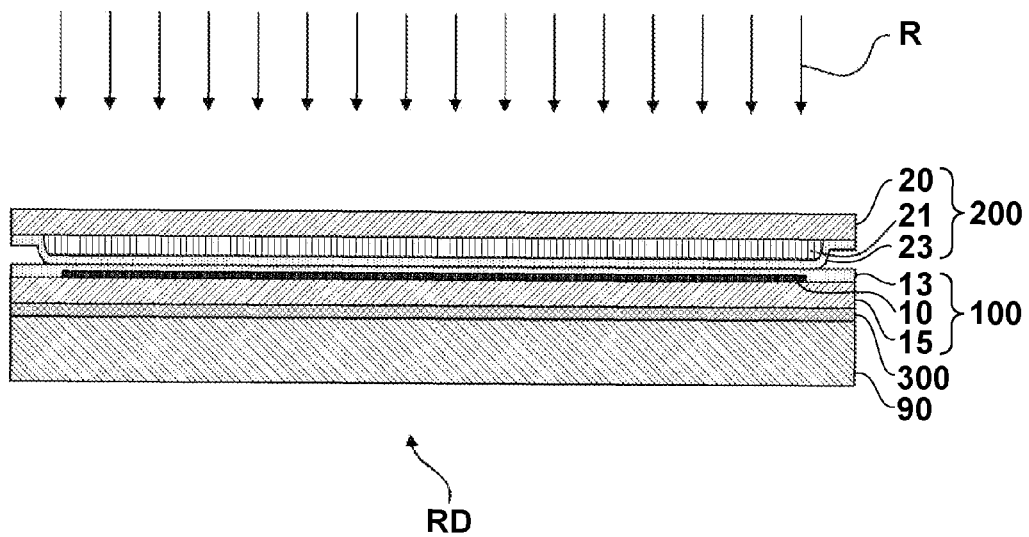
FIG. 3 is a sectional view schematically showing the arrangement of a radiation detection apparatus according to the third embodiment of the present invention.

A radiation detection apparatus RD according to the third embodiment of the present invention will be described with reference to FIG. 3. Particulars that are not mentioned in the third embodiment can comply with the second embodiment. In the radiation detection apparatus RD according to the third embodiment, a scintillator panel 200 is the same as the scintillator panel 200 in the second embodiment. The sensor panel 100 includes a sensor protective layer 13 in place of the sensor protective layer 11 in the second embodiment. The sensor protective layer 13 is formed from a thermoplastic and thermosetting polyimide resin like the scintillator protective layer 23 in the second embodiment. It is possible to bond a thermoplastic and thermosetting polyimide resin as the sensor protective layer 13 to a sensor array 10 in the same manner as when bonding a thermoplastic and thermosetting polyimide resin as the scintillator protective layer 23 to the scintillator layer 21 in the first embodiment. This arrangement can make the scintillator protective layer 23 and the sensor protective layer 13 have similar refractive indices, and hence can reduce the reflection of light at the interface between the scintillator protective layer 23 and the sensor protective layer 13 and improve the sensitivity and resolution.

Figure 4:
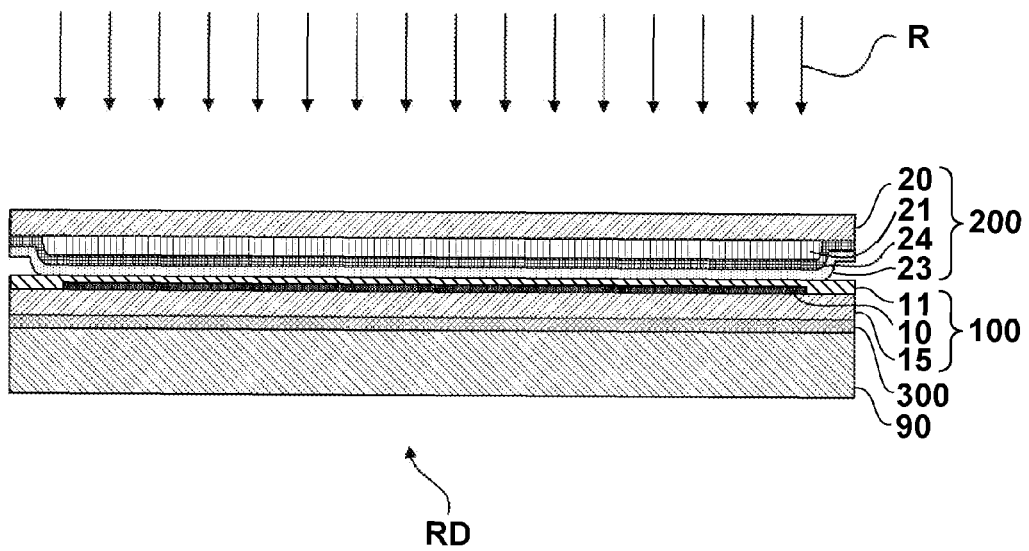
FIG. 4 is a sectional view schematically showing the arrangement of a radiation detection apparatus according to the fourth embodiment of the present invention.

A radiation detection apparatus RD according to the fourth embodiment of the present invention will be described with reference to FIG. 4. Particulars that are not mentioned in the fourth embodiment can comply with the first and second embodiments. A sensor panel 100 in the fourth embodiment is the same as the sensor panel 100 in the second embodiment. A scintillator panel 200 in the fourth embodiment is obtained by placing an additional scintillator protective layer 24 between the scintillator layer 21 and the scintillator protective layer 23 of the scintillator panel 200 in the third embodiment. The additional scintillator protective layer 24 can be formed from parylene. Parylene is an organic material which can be formed by a plasma polymerization method using a vacuum apparatus. This material has good adhesiveness to a fine three-dimensional portion. When CSI:Tl or the like which can form a columnar crystal structure is used as a material for the scintillator layer 21, in particular, the scintillator layer 21 after formation shows a noticeable degradation in characteristics due to humidity. This makes it difficult to work or store the layer in the atmosphere. It is possible to form a protective layer using parylene in a dehumidified state in a vacuum.

The scintillator protective layer 24 made of parylene is formed while a high vacuum state is maintained after the formation of the scintillator layer 21 in the high vacuum state. The scintillator protective layer 24 made of parylene can have a thickness that can secure high humidity resistance in the atmosphere, for example, a thickness in the range of several $\mu m$ to several ten $\mu m$. Thereafter, the scintillator protective layer 23 can be formed from a thermoplastic and thermosetting polyimide resin in the form of a sheet. This structure is advantageous in obtaining high humidity resistance without degrading fluorescent characteristics. The structure exemplified above is provided with the two scintillator protective layers 23 and 24. However, it is possible to provide three or more scintillator protective layers.

The parylene forming the scintillator protective layer 24 has a refractive index of 1.65. The thermoplastic and thermosetting polyimide resin forming the scintillator protective layer 23 has a refractive index of 1.6 to 1.7. A thermosetting polyimide resin forming a sensor protective layer 11 has a refractive index of 1.7. Therefore, reflection at the interfaces between these layers is small, and deterioration in sensitivity and resolution is suppressed.

Figure 5:
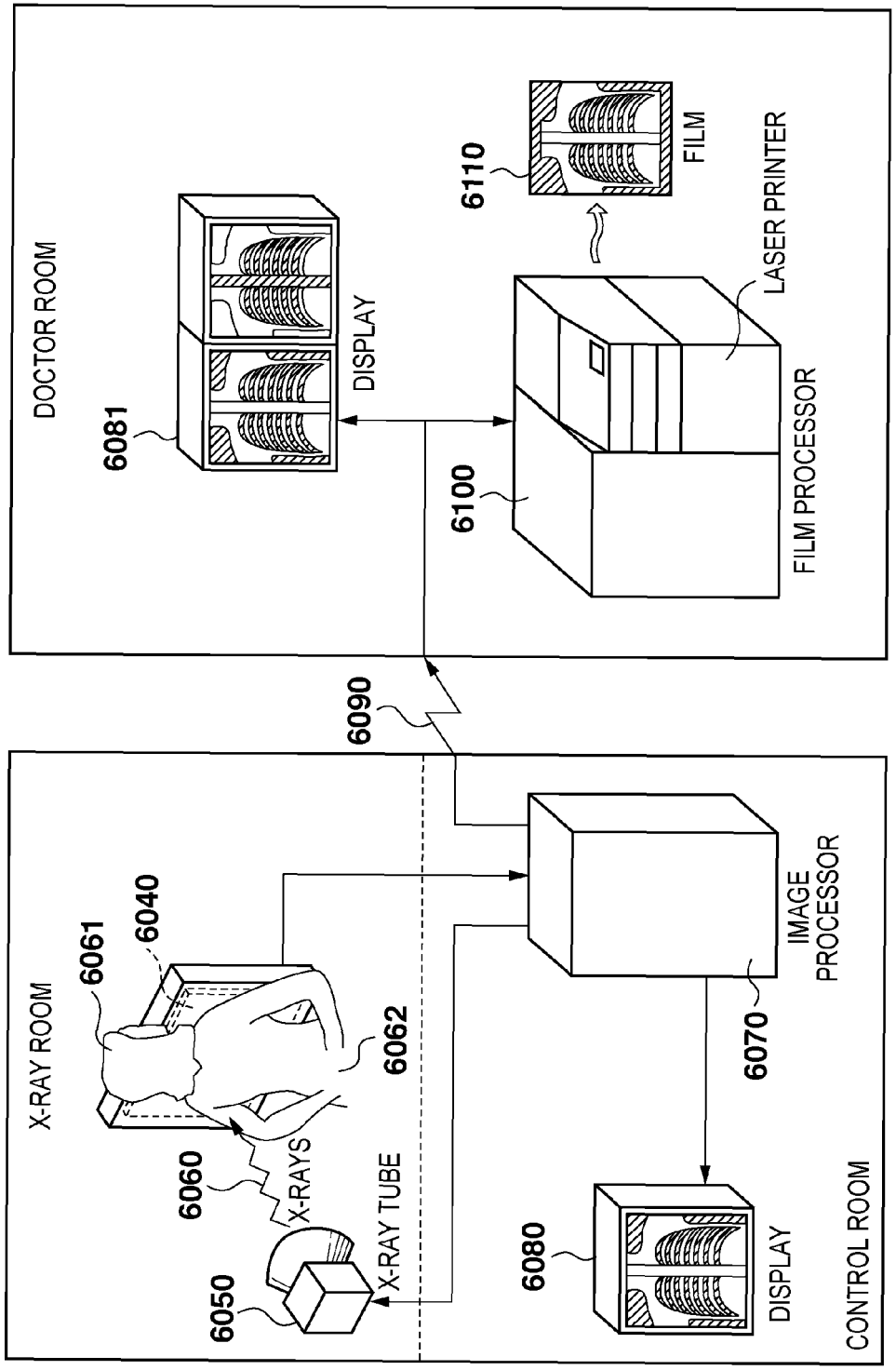
FIG. 5 is a sectional view schematically showing the arrangement of a radiation detection apparatus according to the fifth embodiment of the present invention.

A radiation detection system incorporating the radiation detection apparatus RD represented by the first to fourth embodiments will be described with reference to FIG. 5. X-rays 6060 generated by an X-ray tube (radiation source) 6050 are transmitted through a chest region 6062 of a patient or subject (person to be examined) 6061 strike the radiation detection apparatus RD. The incident X-rays contain information of an intracorporeal region of the subject 6061. The radiation detection apparatus RD converts the incident X-rays into light using the scintillator layer, and detects the light using the sensor array. This can obtain an image containing the information of the intracorporeal region of the subject 6061. This image can be displayed on a display 6080 in a control room upon being processed by an image processor (processing unit) 6070. It is possible to transfer this image to a remote place using a transmission processing unit such as a telephone line 6090. The image can be displayed on a display 6081 in another place such as a doctor room or stored in an optical disk or the like as a recording unit. This allows a doctor in a remote place to perform diagnosis. It is also possible to record the image on a film 6110 as a recording medium using a film processor 6100. Furthermore, the image can be printed on paper by using a laser printer as a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-045706, filed Mar. 2, 2011, which is hereby incorporated by reference herein in its entirety.

What is claimed is:

1. A radiation detection apparatus comprising:
   a scintillator panel including a scintillator layer which converts radiation into light and a scintillator protective layer which protects the scintillator layer; and
   a sensor panel including a sensor array in which a plurality of photoelectric converters which detect light from the scintillator layer are arranged and a sensor protective layer arranged between the sensor array and the scintillator protective layer,
   wherein the scintillator panel is bonded to the sensor panel by making the scintillator layer adhere to the sensor protective layer by using the scintillator protective layer as an adhesive material, and a principal component of the scintillator protective layer is the same as a principal component of the sensor protective layer.

2. The apparatus according to claim 1, wherein a material forming the scintillator protective layer and the sensor protective layer comprises a hot-melt resin.

3. The apparatus according to claim 1, wherein the scintillator protective layer is made of a material comprising a polyimide resin that starts to decrease in viscosity when a temperature is increased to exceed a first temperature, develops adhesiveness when the temperature exceeds a second temperature higher than the first temperature, starts to increase in viscosity when the temperature exceeds a third temperature higher than the second temperature, and loses adhesiveness when the temperature exceeds a fourth temperature higher than the third temperature, and the material forming the sensor protective layer comprises a polyimide resin.

4. The apparatus according to claim 1, wherein a material forming the scintillator protective layer and the sensor protective layer starts to decrease in viscosity when a temperature is increased to exceed a first temperature, develops adhesiveness when the temperature exceeds a second temperature higher than the first temperature, starts to increase in viscosity when the temperature exceeds a third temperature higher than the second temperature, and loses adhesiveness when the temperature exceeds a fourth temperature higher than the third temperature.

5. A radiation detection system comprising:
a radiation source; and
a radiation detection apparatus defined in claim 1, which is configured to detect radiation emitted from the radiation source and transmitted through a subject.

6. A method of manufacturing a radiation detection apparatus, the method comprising:
a first step of manufacturing a scintillator panel by bonding a scintillator protective layer to a scintillator layer, which converts radiation into light, so as to protect the scintillator layer; and
a second step of bonding the scintillator panel to a sensor panel including a sensor array in which a plurality of photoelectric converters which detect light from the scintillator layer are arranged and a sensor protective layer, such that the sensor protective layer is arranged between the sensor array and the scintillator protective layer,
wherein in the first step, the scintillator protective layer is bonded to the scintillator layer by decreasing viscosity of the scintillator protective layer by heating the scintillator protective layer, and then increasing the viscosity by cooling the scintillator protective layer, and
in the second step, the scintillator panel is bonded to the sensor panel by decreasing the viscosity of the scintillator protective layer by heating the scintillator protective layer, and then increasing the viscosity by further heating the scintillator protective layer.

7. The method according to claim 6, wherein a principal component of the scintillator protective layer is the same as a principal component of the sensor protective layer.

* * * * *